US009589114B2

(12) United States Patent
Strom et al.

(10) Patent No.: US 9,589,114 B2
(45) Date of Patent: Mar. 7, 2017

(54) POLICY FOR DIGITAL RIGHTS MANAGEMENT

(75) Inventors: Clifford P. Strom, Sammamish, WA (US); Stephen P. DiAcetis, Duvall, WA (US); Mark E. Paley, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 843 days.

(21) Appl. No.: 12/652,513

(22) Filed: Jan. 5, 2010

(65) Prior Publication Data
US 2011/0167499 A1 Jul. 7, 2011

(51) Int. Cl.
| | | |
|---|---|---|
| H04L 29/06 | (2006.01) |
| G06F 21/12 | (2013.01) |
| G06Q 20/14 | (2012.01) |

(52) U.S. Cl.
CPC ......... *G06F 21/121* (2013.01); *G06Q 20/145* (2013.01)

(58) Field of Classification Search
CPC ...... G07F 17/32; G07F 17/3227; G07F 21/10; A63F 2300/201; G06F 21/121; H04L 2463/101
USPC ................... 726/27–33; 463/29–33
See application file for complete search history.

(56) References Cited

U.S. PATENT DOCUMENTS

| | | | | |
|---|---|---|---|---|
| 7,080,409 B2 * | 7/2006 | Eigeles | ............... | H04L 63/06 713/182 |
| 7,571,328 B2 | 8/2009 | Baumert et al. | | |
| 8,336,772 B2 * | 12/2012 | Racz | ............... | G06F 21/10 235/380 |
| 8,777,737 B2 * | 7/2014 | LeMay | ............... | G07F 17/32 463/29 |
| 2006/0075076 A1 * | 4/2006 | Sinha | ............... | G06F 8/67 709/220 |
| 2006/0242081 A1 * | 10/2006 | Ivanov et al. | ............... | 705/59 |
| 2007/0100768 A1 | 5/2007 | Boccon-Gibod et al. | | |
| 2007/0265068 A1 * | 11/2007 | Kane et al. | ............... | 463/29 |
| 2008/0113785 A1 * | 5/2008 | Alderucci et al. | ............... | 463/29 |
| 2008/0113786 A1 * | 5/2008 | Alderucci et al. | ............... | 463/29 |
| 2008/0177627 A1 * | 7/2008 | Cefail | ............... | 705/14 |
| 2008/0234047 A1 * | 9/2008 | Nguyen | ............... | G07F 17/32 463/42 |

(Continued)

FOREIGN PATENT DOCUMENTS

| | | |
|---|---|---|
| CN | 101167072 | 4/2008 |
| CN | 101206699 | 6/2008 |
| CN | 101609495 | 12/2009 |

OTHER PUBLICATIONS

Pricing game for selfish link cooperation, Ng et al, Information Theory, 2008. ISIT 2008. IEEE International Symposium, IEEE, Jul. 2008.*

(Continued)

*Primary Examiner* — Luu Pham
*Assistant Examiner* — Jahangir Kabir
(74) *Attorney, Agent, or Firm* — Gregg Wisdom; Judy Yee; Micky Minhas

(57) ABSTRACT

This document describes policies for digital rights management that enable distribution of full-function versions of applications that, while fully functional, have functions limited by an associated policy. A policy may be replaced or updated, thereby enabling use of previously limited functions without distribution of another version of the application.

22 Claims, 5 Drawing Sheets

(56) References Cited

U.S. PATENT DOCUMENTS

| | | | |
|---|---|---|---|
| 2009/0089881 | A1 | 4/2009 | Indenbom |
| 2009/0113413 | A1* | 4/2009 | Reinz .................. G06F 19/3412 717/173 |
| 2009/0205017 | A1* | 8/2009 | Yabe ................................ 726/1 |
| 2009/0327077 | A1* | 12/2009 | Kim .......................... 705/14.53 |
| 2010/0069151 | A1* | 3/2010 | Suchocki ........................ 463/31 |
| 2010/0235261 | A1* | 9/2010 | Lloyd ....................... G06F 8/61 705/26.1 |
| 2011/0302054 | A1* | 12/2011 | Hulst ...................... G06F 21/10 705/26.41 |

OTHER PUBLICATIONS

Selling or Subscribing Software under Quality Uncertainty and Network Externality Effect, Zhang et al, System Sciences (HICSS), 2010 43rd Hawaii International Conference, IEEE, Jan. 5-8, 2010.*

"The Trial of Software", Retrieved at <<http://www.avangate.com/articles/build-software-trial-versions-147.htm>>, Jul. 31, 2008, pp. 3.

"Tanta License Manager ", Retrieved at <<http://www.openbit.com/pdf/Tanla_LM_Whitepaper_05022009.pdf>>, Feb. 2009, pp. 17.

"Sentinel UltraPro Product FAQ", Retrieved at <<http://www.safenet-inc.com/products/sentinel/sentProdUltraFAQ.asp>>, 2009, pp. 2.

"ATPM", Retrieved at <<http://www.atpm.com/Back/pdf/ATPM-707-screen.pdf>>, 7.07 / Jul. 2001, vol. 7, No. 7, pp. 1-115.

Krumm, et al. , "A Policy-Based Framework for Interoperable Digital Content Management", Retrieved at <<http://www.las.ic.unicamp.br/paulo/papers/2007-CCNC-fernando.marques-joao.porto-framework.drm.pdf>>, 2007, pp. 5.

"Protection for Software and Games", Retrieved at <<http://uniloc.web4.hubspot.com/Default.aspx?app=LeadgenDownload&shortpath=docs%2Fsoftanchordatasheet.pdf>>, 2008, pp. 8.

"Foreign Office Action", Chinese Application No. 201110021516.0, (Apr. 3, 2013), 12 pages.

"Foreign Office Action", CN Application No. 201110021516.0, Nov. 18, 2013, 17 Pages.

"Foreign Office Action", CN Application No. 201110021516.0, Jun. 13, 2014, 7 pages.

"Foreign Office Action", CN Application No. 201110021516.0, Dec. 23, 2014, 7 Pages.

* cited by examiner

POLICY FOR DIGITAL RIGHTS MANAGEMENT

BACKGROUND

Software providers often introduce users to their applications by first providing users with limited-function versions of those applications, generally at low or no cost. After a user tries out a limited-function version, providers hope that the user will like it and purchase a full-function version. Examples of this conventional approach include a low-cost version of a PDF reader that can read but not edit PDFs, a free download of a 30-second clip of a music video rather than the full-length video, and a free gaming application that cannot reach higher game levels or be played for more than a set period of time.

SUMMARY

This document describes policies for digital rights management that enable distribution of full-function versions of applications that, while fully functional, have functions limited by an associated policy of a license. A license's policy may be replaced or updated, thereby enabling full use of previously limited functions without distribution of another version of the application.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes policies for digital rights management that enable distribution of full-function versions of applications that, while fully functional, have functions limited by an associated license policy. A license policy may be replaced or updated, thereby enabling use of previously limited functions without distribution of another version of the application. Thus, in some embodiments, a full-function application may be provided to a user on a trial basis but with some functions limited or unusable until the user pays the application's provider to enable these functions. Various embodiments of these techniques and apparatuses save distribution bandwidth, permit content providers to forgo building separate, limited-function versions of their applications, and/or enable new approaches to payment and use of applications, such as per-function pricing.

Example Environment

Figure 1:
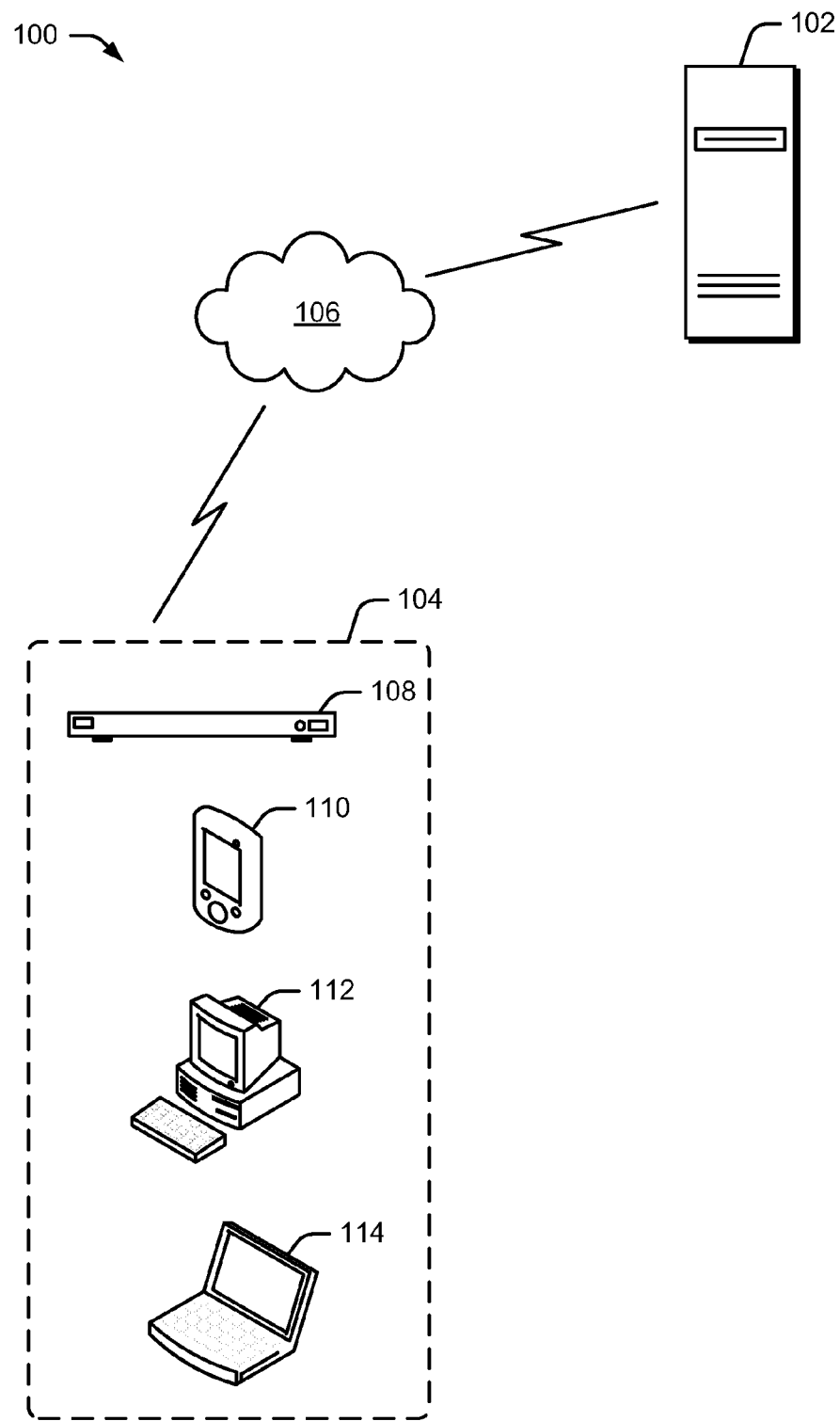
FIG. 1 is an illustration of an environment in which a license policy of a digital rights management scheme for protecting content is used to manage functions of an application.

FIG. 1 is an illustration of an example environment 100 in which a license policy of a digital right management scheme for protecting content is used to manage functions of an application. Environment 100 includes a remote provider 102, which communicates with computing device 104 over communication network 106. Communication network 106 may include the Internet, a local-area network, a wide-area network, a wireless network, and/or a USB hub, to name a few.

Figure 2:
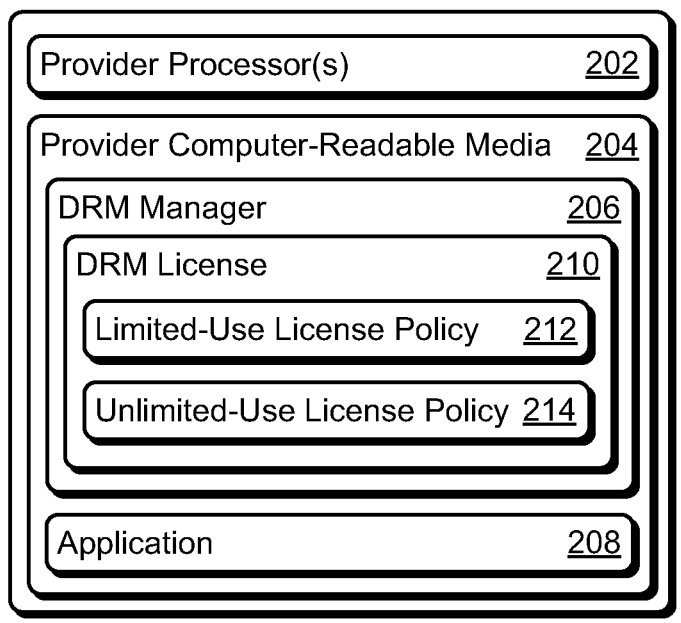
FIG. 2 is a more-detailed illustration of the remote provider of the environment of FIG. 1.

Remote provider 102 is illustrated in detail in FIG. 2, which shows remote provider 102 including provider processor(s) 202 and provider computer-readable media 204 having a digital rights management (DRM) manager 206 and application 208. DRM manager 206 is capable of acquiring a DRM license 210 having a limited-use license policy 212 and/or unlimited-use license policy 214. DRM license 210 enumerates a policy that, when followed, protects application 208 from unauthorized use based on various digital rights management protocols. Policies 212 and 214 of DRM license 210 are associated with application 208 and a user, group of users, or device on which application 208 may be executed (e.g., computing device 104).

Computing device 104 is illustrated with various example devices, including a set-top box 108, a smart-phone 110, a desktop computing device 112, and a laptop computing device 114.

Figure 3:
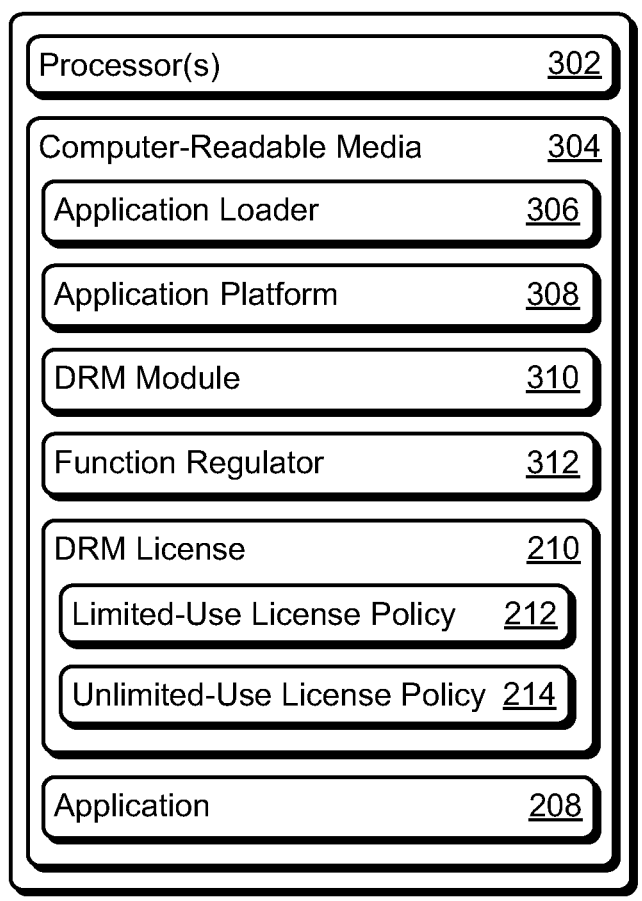
FIG. 3 is more-detailed illustration of the computing device of the environment of FIG. 1.

Computing device 104 is illustrated in detail in FIG. 3, which shows computing device 104 including one or more processors 302 and computer-readable media 304. Computer-readable media 304 contains or has access to an application loader 306, application platform 308, DRM module 310, and function regulator 312. While illustrated separately, function regulator 312 may be integral with any one or more of application loader 306, application platform 308, or DRM module 310. As will be described in more detail below, function regulator 312 can also or instead be included as a module, applet, or integrated code within application 208. Computing device 104 also includes DRM license 210 and at least one of policies 212 or 214, as well as application 208 (shown in FIG. 2). These may preexist or be provided, such as by remote provider 102.

Note that one or more of the entities shown in FIGS. 1, 2, and 3 may be further divided, combined, and so on. Thus, environment 100 illustrates some of many possible environments capable of employing the described techniques.

Generally, any of the techniques and abilities described herein can be implemented using software, firmware, hardware (e.g., fixed-logic circuitry), manual processing, or a combination of these implementations. The entities of environment 100 generally represent software, firmware, hardware, whole devices or networks, or a combination thereof. In the case of a software implementation, for instance, the entities (e.g., DRM manager 206 and function regulator 312) represent program code that performs specified tasks when executed on a processor (e.g., CPU or CPUs). The program code can be stored in one or more computer-readable memory devices, such as computer-readable media 204 or 304. The features and techniques described herein are platform-independent, meaning that they may be implemented on a variety of commercial computing platforms having a variety of processors.

Example Processes

The following discussion describes ways in which the techniques may operate to use a license policy to manage an application's functions. Aspects of these processes may be implemented in hardware, firmware, software, or a combination thereof. These processes are shown as sets of blocks that specify operations performed, such as through one or more entities or devices, and are not necessarily limited to the order shown for performing the operations by the respective blocks. In portions of the following discussion reference may be made to environment 100 of FIG. 1 (including as detailed in FIGS. 2 and 3).

Figure 4:
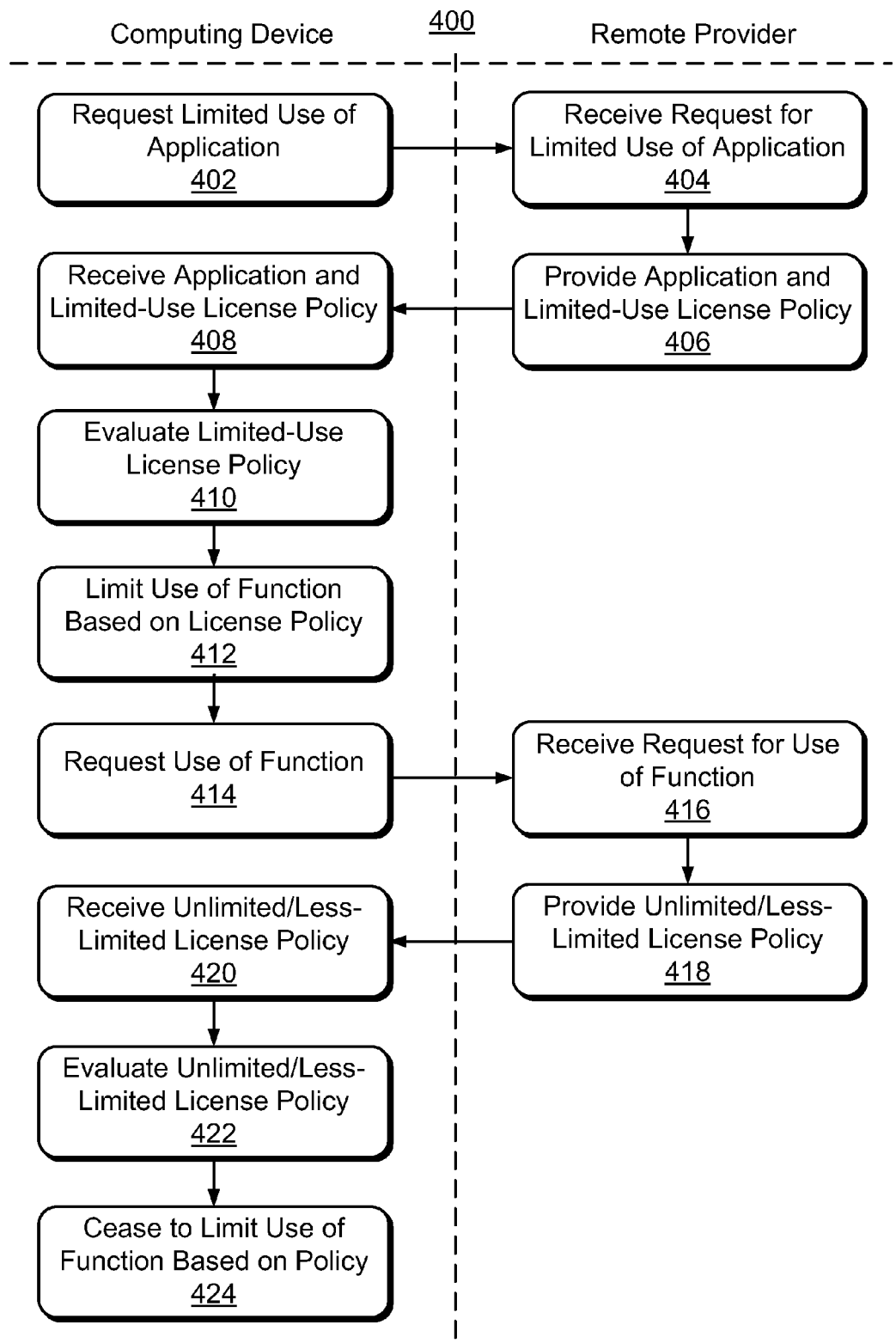
FIG. 4 is a flow diagram depicting an example process for managing functions using a license policy of a digital rights management scheme.

FIG. 4 is a flow diagram depicting an example process 400 showing operations of remote provider 102 and computing device 104. In process 400 remote provider 102 and computing device 104 act and interact to manage functions of application 208.

Block 402 requests limited use of an application. While not required, assume here for the sake of example that a user of computing device 104 is viewing various gaming applications at an Internet-enabled storefront provided by remote provider 102. These gaming applications include a first-person shooter game, an old-style arcade game, and a card game (e.g., solitaire or "Texas Hold'em"). Here the user selects a free trial of the first-person shooter game. Note that the application could instead be a movie, music video, or business application (e.g., word processing application), to name a few.

Block 404 receives a request from a client computing device. Here the request includes information about the user of the computing device, though information about a group of users (e.g., a business), the user's computing device, or even no information can instead be included. Continuing the example, remote provider 102 receives the user's identity along with the request to download the first-person shooter game for a trial use.

Block 406 provides a requested application and a license policy governing its use to a computing device. Here remote provider 102 provides application 208 (the first-person shooter game) to computing device 104 via download over communication network 106. Remote provider 102 also provides DRM license 210 having limited-use license policy 212, which here limits various functions of the trial use. Note that the function being limited may be of many different types, such as time of use or particular functions being unusable or less usable. In the context of this first-person shooter game, limited-use license policy 212 limits the game to be playable for only a certain number of levels, for a certain amount of time, and particular abilities and functions within the game.

This license policy may be associated with a user or group of users, thereby prohibiting use by others, though this is not required. This license policy can be associated with the user, group of users, or device based on information received as part or incident with the request for limited use of block 402. In one embodiment this and other policies (or updates to policies) are bound to a user's device using a public/private key pair. A content key used to encrypt the content is encrypted with the public key of the DRM manager's 206 private/public key pair, which only the user's device may decrypt using the private key of that public/private key pair.

Block 408 receives an application having a function limited by a policy of a DRM license (the "license policy"), the license policy indicating that use of the function is limited. Here the first-person shooter game is received, along with limited-use license policy 212. Note that either of policy 212 or 214 may be received as part of a license (e.g., DRM license 210) rather than separate from the license in which the license policy is a part.

Block 410 evaluates the limited-use license policy. Thus, prior to executing the application, the license policy and its accompanying DRM license (212 and 210, respectively) are evaluated. Here DRM module 310 receives DRM license 210 and license policy 212 and determines whether they are valid and unmodified. DRM module 310 may determine validity based on a cryptographic signature or in other manners. DRM module 310 may then pass information found in the limited-use license policy 212 to function regulator 312. If function regulator 312 is integral with DRM module 310, DRM module 310 may manage the function limited by the limited-use license policy 212, such as to prohibit application 208 from proceeding after a certain amount of time. In this ongoing example, however, DRM module 310 passes the limited-use license policy 212 or information found in the policy to application 208, which contains function regulator 312. DRM module 310 may pass information found in the policy to application 208 in a format easily understood by application 208 and/or function regulator 312.

Block 412 limits use of a function of an application based on a limited-use license policy. Thus, block 412 can limit a function based on information evaluated from limited-use license policy 212. In the ongoing example, limited-use license policy 212 indicates limitations of a certain game level, a certain amount of game time, and use of a certain in-game ability. Function regulator 312 limits the first-person shooter game from going to a particular level, past a certain amount of time, and use of in-game ability (e.g., use of a weapon by the first-person shooter). Here function regulator 312 is part of application 208, and thus limits functions internally, though this is not required, as application loader 306 or application platform 308, for instance, may limit some functions of application 208.

Block 414 requests use of a limited function. In some embodiments, a user may request, through his or her computing device 104, to use a limited function. Continuing the ongoing embodiment, assume that the user is playing the first-person shooter game with limited functions (e.g., a trial use). The user may simply decide to purchase unlimited use of the application, thus going from a trial use to a full use of the application. The user may also reach the maximum level or amount of play time, or attempt to use the in-game ability, and decide to purchase the right to use a particular function, rather than all currently limited function (e.g., pay to use the in-game ability only). In these cases, computing device 104 requests use of a currently limited function from remote provider 102, whether full use or additional use.

Block 416 receives a request to use a limited function. Remote provider 102 may receive this request and determine to enable use of this limited function based on various criteria, such as receiving a direct payment, an indication of a subscription service being used, or an agreement to allow advertisements in the application.

Block 418 provides an unlimited-use or less-limited license policy permitting a function that is currently limited, the license policy effective to enable use of a limited function (e.g., the function requested at block 414). Here remote provider 104 provides unlimited-use license policy 214 to client computer 104 responsive to the user of the first-person shooter game (application 208) paying for this unlimited use. Block 418 may provide this policy as an update or supplement to a prior policy (e.g., limited-use license policy 212) or as a new license having a new policy (e.g., another license 210 but having unlimited-use license policy 214). This license policy may be associated with (or bound to) the user, the user's device, a group of users to which the user belongs, or a collection of computing devices.

Block 420 receives an unlimited-use (or less-limited) license policy permitting use of a function, such as use of the function requested at block 414. This license policy may permit unlimited use of all functions or enable use of some functions, such as just an in-game ability or skipping over a certain advertisement of an application having media content, to name a few.

Block 422 evaluates a license policy similarly to as performed at block 410. This can be performed by DRM module 310 and information about the license policy passed to function regulator 312.

Block 424 ceases to limit use of a function or permits unlimited/less-limited use, as appropriate to a license policy received. With receipt of a new license policy, for example, block 424 uses the function as defined in the policy, which here is unlimited or less limited than enumerated in the prior license policy. In the ongoing example, function regulator 312 receives information indicating that the received license policy permits unlimited use of application 208. Responsive to this function regulator 312 ceases to limit functions of application 208. Function regulator 312 may also continue to limit some functions if the license policy received is a limited-use license policy (though less limited at least by ceasing to limit the requested function at block 414).

Continuing the prior example, assume that the user reaches the maximum level of the first-person shooter game, at which point function regulator 312 indicates that the maximum level is reached from within a user interface of application 208 and while functions of application 208 are paused. At this point function regulator 312 enables the user to select to pay (in some fashion) to continue to the next level, which is communicated to (or made directly by the user through) the store-front of remote provider 102. Thus, the application may execute continuously; the user may select to cease limiting the application's function and continue to the next level without stopping play outside of a pause.

Note also other examples of this—if application 208 is media content, such as a movie, a user may be watching the movie without being able to use a desirable function, such as one that permits the user to skip advertisements. The user may decide to pay to cease this limitation, thereafter being enabled to skip the advertisements. To do so, a new or updated license policy can be received. The user does not need, in this embodiment, to download a new application (here a movie), but may instead simply continue to use the application with the use now unlimited. The application may even not be paused, such as when a user interface is available that is part of or separate from application 208, selection of which indicates a request to use a function.

Figure 5:
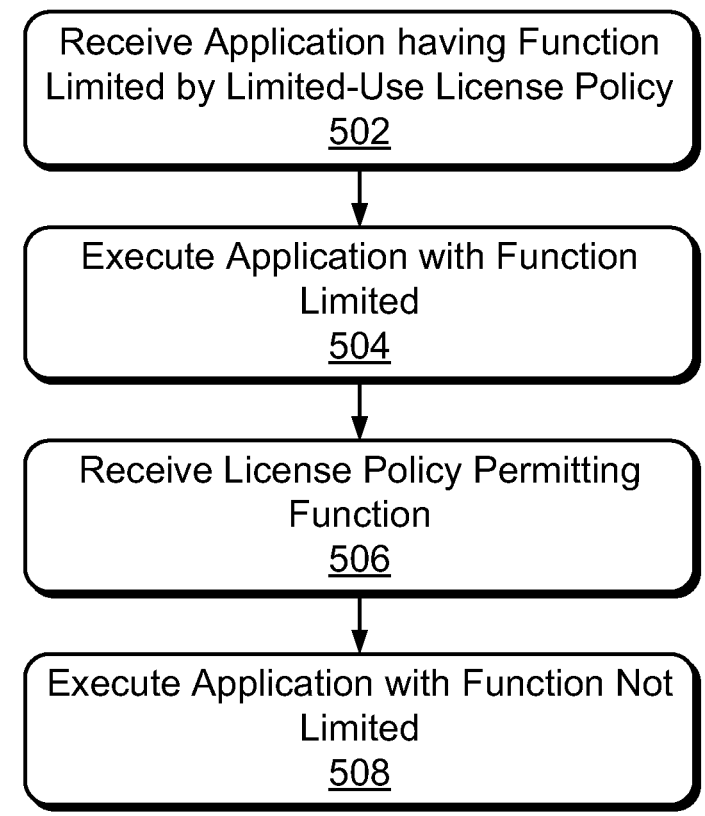
FIG. 5 is a flow diagram depicting an example process for executing an application based on a license policy associated with the application.

FIG. 5 is a flow diagram depicting an example process 500 showing operations of computing device 104. In process 500 computing device 104 executes an application managed by a license policy.

Block 502 receives an application having a function limited by a limited-use license policy. Similarly to the above description, computing device 104 may receive application 208 and limited-use license policy 212 similarly to that of block 408 of process 400. Computing device 104 may also receive application 208 and limited-use license policy 212 separately.

Block 504 executes an application with a function limited by the limited-use license policy. Computing device 104 may receive limited-use license policy 212 in an encrypted format, after which DRM module 310 decrypts the limited-use license policy 212 (e.g., with a private key of a public/private key pair, the public key used to encrypt limited-use license policy 212). With limited-use license policy 212 decrypted, function regulator 312 follows the restrictions noted in the license policy, which here we assume are to limit a function of application 208, such as by not enabling a function, ceasing to continue use of a function or the application after a certain period, and so forth.

Block 506 receives an unlimited-use (or less limited use) license policy. This may be received as a completely separate license policy or an update to the limited-use license policy received at block 502. Similarly to the above description of process 400, computing device 104 may receive the license policy in a manner like that of block 420 of process 400.

Block 508 executes the application with the limited function not limited. Computing device 104 may receive unlimited-use license policy 214 in an encrypted format, after which DRM module 310 decrypts the content key used to encrypt the content (e.g., application 208), which is associated with unlimited-use license policy 214. Function regulator 312 follows the license policy, which here indicates that the previously limited function may now be fully used.

By way of example, assume that limited-use license policy 212 indicates that a gaming application may not proceed past level three. Here unlimited-use license policy 214 permits the gaming application to proceed past level three to as many levels as the gaming application may perform. Thus, a user may download a fully-functional gaming application with a limited function (only three levels) and then later download an updated, additional, or new license policy that permits unlimited use. The user's computing device (here 104) may do so during execution of the gaming application—thus, the application may pause when level three is done, generate a user interface to prompt the user to determine if he wishes to enable full use of the application, after which the user may indicate this (e.g., by paying for full use). The application (either itself or some other entity, such as function regulator 312 or application platform 308) contacts remote provider 102, gains unlimited-use license policy 214, and then decrypts the content key used to encrypt application 208, and analyzes the license policy. The gaming application may then proceed to level four of the game. Note that this may be done without shutting down the application or downloading an updated or new version of the application. The method may also be performed without even pausing the application, though in this example the application pauses at the end of level three.

Conclusion

This document describes policies for digital rights management that enable distribution of full-function versions of applications that, while fully functional, have functions limited by an associated license policy. By so doing, distribution bandwidth may be saved, resources to build limited-function version of applications may be saved, and/or new approaches to payment and use of applications may be used. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
limiting, by a computing device comprising one or more processors, use of a function of a gaming application during execution of the application based on a first policy of a first digital rights management (DRM) license, the first policy of the first DRM license indicating that the function is limited;
receiving a selection indicating a request to use the limited function, the selection being received via a user interface separate from the application;
responsive to receiving the selection and without receiving another version of the application from a remote location, enabling the application to use the function limited by the first policy of the first DRM license by automatically supplementing the first DRM license according to a second policy of a second DRM license after receiving direct payment information for verification to enable the limited function, the second policy supplementing the first policy and indicating that the function limited by the first policy is usable after being validated by cryptographic signatures, the second policy being encrypted such that the computing device decrypts the second policy to follow the information noted in the second policy; and
using the function included in the gaming application limited by the first policy of the first DRM license after supplementing the first policy of the first DRM license according to the second policy of the second DRM license without requiring that the application pause prior to using the function limited by the first policy of the first DRM license based, at least in part, on the selection received via the user interface separate from the application.

2. The method as recited in claim 1, wherein the second policy is associated with the application and a device or group of devices.

3. The method as recited in claim 1, wherein the function is an ability to continue play past a game level or an amount of game time.

4. The method as recited in claim 3, wherein the enabling the application to use the limited function permits the application to continue play past the game level or the amount of time.

5. The method as recited in claim 1, wherein the function is an in-game ability.

6. The method as recited in claim 1, further comprising receiving the second policy while the application is executed and during the act of limiting the use.

7. The method as recited in claim 1, wherein the act of limiting and the act of enabling the application to use the limited function are performed by the application.

8. The method as recited in claim 1, wherein the act of limiting and the act of enabling the application to use the limited function are performed by an application platform or application loader of the application.

9. The method as recited in claim 1, the function being included in a previously received version of the application as encrypted content, the content being encrypted such that a private key stored in a DRM manager of the computing device is configured to decrypt the encrypted content.

10. The method as recited in claim 1, wherein the first DRM license and the second DRM license are different licenses and the first policy and the second policy are different policies.

11. The method as recited in claim 1, wherein and information found in the first policy is in a format understandable by the application.

12. The method as recited in claim 1, wherein the application comprises media content and the function permits skipping over one or more advertisements in the media content.

13. The computing device as recited in claim 1, wherein information found in the first policy is in a format understandable by the application.

14. A method comprising:
providing, by a first computing device comprising one or more processors, a full-function version of a gaming application to a second computing device, the application governed by a digital rights management (DRM) license containing a first policy;
limiting use of a function of the application based on the first policy of the DRM license that limits the function during execution of the application on the second device;
receiving, at the first computing device, a request from the second computing device to use the function of the application limited by the first policy of the DRM license, the request from the second computing device indicating a subscription service being used;
responsive to receiving the request from the second computing device indicating a subscription service being used and without receiving another version of the application from a remote location, providing a second policy of the DRM license validated based on use of the subscription service to the second computing device effective to enable the application to use the function previously provided in the full-function version of the application, the second policy being encrypted such that the computing device decrypts the second policy to follow the information noted in the second policy; and
responsive to providing the second policy of the DRM license, and after receiving direct payment information for verification to enable the function provided in the full-function, enabling the application to use the function previously provided in the full-function version of the application according to information found in the second policy that supplements and defines the use of the function in the first policy without requiring that the application pause between execution of the application with the function limited and execution of the application with the function not limited.

15. The method as recited in claim 14, wherein providing the second policy is responsive to receiving payment for the subscription service.

16. The method as recited in claim 14, wherein the first policy is a trial policy limiting the function and additional functions of the application and the second policy is a full-use policy permitting use of the function and the additional functions.

17. A computing device comprising:
one or more processors; and
one or more computer-readable memory devices storing instructions that, responsive to execution by the one or more processors, causes the computing device to implement acts comprising:
limiting use of a function of a gaming application during execution of the application based on a first policy of a first digital rights management (DRM) license, the first policy of the first DRM license indicating that the function is limited;

receiving a selection indicating a request to use the limited function, the selection being received via a user interface separate from the application;

responsive to receiving the selection and without receiving another version of the application from a remote location, enabling the application to use the function limited by the first policy of the first DRM license by supplementing the first DRM license according to a second policy of a second DRM license, after receiving direct payment information for verification to enable the function limited by the first policy, the second policy indicating that the function limited by the first policy is usable after being validated, the second policy being encrypted such that the computing device decrypts the second policy to follow the information noted in the second policy; and using the function limited by the first policy of the first DRM license, after supplementing the first policy of the first DRM license according to the second policy of the second DRM license, without requiring that the application pause prior to using the function limited by the first policy of the first DRM license based, at least in part, on the selection received via the user interface separate from the application.

18. The computing device of claim 17, the acts further comprising receiving the second policy while the application is executed and during the act of limiting the use.

19. The computing device as recited in claim 17, wherein the act of limiting and the act of enabling the application to use the limited function are performed by an application platform or application loader of the application.

20. The computing device as recited in claim 17, the function being included in a previously received version of the application as encrypted content, the content being encrypted such that a private key stored in a DRM manager of the computing device is configured to decrypt the encrypted content.

21. The computing device as recited in claim 17, wherein the first DRM license and the second DRM license are different licenses and the first policy and the second policy are different policies.

22. The computing device as recited in claim 17, wherein the application comprises media content and the function permits skipping over one or more advertisements in the media content.

* * * * *